United States Patent [19]
Gilead

[11] 4,175,882
[45] Nov. 27, 1979

[54] HOSE CONDUITS FOR DRIP- OR TRICKLE EMISSION

[76] Inventor: Gideon Gilead, 5 Nicaraqua St., Jerusalem, Israel

[21] Appl. No.: 755,482

[22] Filed: Dec. 29, 1976

[30] Foreign Application Priority Data

Jan. 8, 1976 [IL] Israel ........................................ 48810

[51] Int. Cl.² .......................... E02B 13/00; B05B 15/00
[52] U.S. Cl. ....................................... 405/43; 138/148; 138/103; 138/42; 138/156; 239/542; 239/547; 156/217; 156/203
[58] Field of Search ..................... 61/12; 239/542, 547; 138/140, 121, 103, 42, 156; 405/54, 51, 43; 156/217, 203

[56] References Cited

U.S. PATENT DOCUMENTS

| | | | |
|---|---|---|---|
| 3,870,236 | 3/1975 | Barragan | 61/12 |
| 3,873,030 | 3/1975 | Barragan | 138/42 X |
| 3,887,138 | 6/1975 | Gilead | 239/542 |
| 3,927,464 | 12/1975 | Wallsten | 138/115 X |
| 4,022,384 | 5/1977 | Hoyle et al. | 138/42 |

*Primary Examiner*—Harry N. Haroian
*Attorney, Agent, or Firm*—Weingarten, Maxham & Schurgin

[57] ABSTRACT

A hose conduit comprises an inner tubular fluid conducting space which is surrounded by a ringshaped space. Openings are provided in the wall of the inner hose leading into the ringshaped space. In the ringshaped space is provided a longway passage extending through repeated bows and bends and repeatedly changing its direction. From the said longway passage openings in the outer wall of the said ringshaped space lead into the open. The assembly of the hose conduit is built up of at least two layers of thin foil which are connected together. The longway passage is obtained by profiling one of the foils, i.e. by applying a raised, embossed pattern to one of the foils.

8 Claims, 8 Drawing Figures

HOSE CONDUITS FOR DRIP- OR TRICKLE EMISSION

FIELD OF INVENTION

The present invention concerns a hose conduit intended to serve the irrigation of field and garden crops. More particularly the invention relates to thin walled, so called "expendable" conduits, i.e. those which remain in use for a limited period of time and which—after having served their purpose—can be discarded being thrown away or destroyed. Such conduits are used in particular for drip or trickle irrigation systems.

STATE OF ART

It is already known to make such conduits from plastic foils in such a way that two lengths of foil are placed onto one another and are fused together at their longitudinal edges, whereupon the so obtained hose like member is folded along its median, longitudinal line so that there are four superposed layers which are again fused together along their free edge. In this manner there is created a tubular conduit which extends within a second, outer conduit. Thus water can flow in the inner conduit; holes are provided at predetermined points in the wall of the inner conduit leading into the outer, annular conduit which encloses the first named inner one. Further holes are provided in the wall of the outer conduit, through which outer holes the water is permitted to flow into the open.

Usually, as e.g. described in the U.S. Ser. No. 3,698,195 (Chapin) there is a predetermined ratio between the number of holes in the inner and the number of holes in the outer wall. The difference of diameters of the two hoses (when united) is rather small. The result of such an arrangement is that pressure in the outer (ring-shaped) conduit is a fraction of the pressure in the inner conduit. Such "foil hoses" though being comparatively inexpensive and being easily manufactured have certain innate drawbacks. Each hole connecting the inner conduit with the outer one has coordinated to it a number of holes leading from the outer conduit into the open. Practice and experience have shown that the quantity of water emitted from such a combined conduit is not uniform at all points of emission. The reason for the lack of uniformity of emission is that since the pressure in the outer conduit is usually about one tenth only of the pressure in the inner conduit difference in the level on which the conduit is laid out become highly influential. Where the ground is not absolutely plane and the conduit extends over different levels of ground it is found that at the higher points less, or even no emission of water takes place. In practice a difference in levels of about 40 cms is fatal. It is also known in drip- or trickle irrigation systems to use so called emitters of water. In such devices a long way passage in the form of a labyrinth, a maze or spirally wound throughflow is provided. In such a winding or meandering passage of increased length the flow is braked with the result that at the end of the throughflow the water is pressureless and exits in the form of a slow trickle or dropwise. Such emitters are used mainly in permanent irrigation systems or such which are intended to remain in place for a long time.

OBJECTS OF THE INVENTION

It is an object of the present invention to create a device for use, mainly, in drip-or trickle irrigation, which can be produced at low cost, i.e. a conduit the manufacture of which can be realised with simple means so that the device does become discardable (if so wished) after having served its purpose and being considered as ripe for being written off.

SHORT SUMMARY OF INVENTION

Accordingly this invention provides a hose conduit comprising an inner tubular space extending the whole length of the conduit in axial direction, this inner space being surrounded by a ringshaped space in which latter there is provided a long way passage performing repeated bows and bends and repeatedly changing its direction, openings being provided leading from the inner tubular space into the outer long way passage and further openings leading from said long way passage into the open, the said conduit being built up of at least two layers of foil, the layers being connected together and the said longway passage being attained by profiling of one of the foils, i.e. by applying to it a raised, embossed pattern. In one embodiment of the invention the said longway passage is subdivided into sections which are sealed off against one another.

The foil material to be used is generally plastics, but the invention could be realised also by using thin metal foils or rubber sheets or like material. Plastics may be fused together or may be connected by means of an adhesive. Metal foils may be welded, soldered or may be connected by commercially available metal connecting glue or cement.

The invention relates to a method for making such conduits, such method comprising the steps of (a) placing onto one another two or more layers of foil one of which had been provided with a continuous embossed, raised pattern constituting a groove the concavity of which is directed towards the other foil, the said pattern comprising a number of repeated bows and bends and changes of direction;

(b) connecting the layers at their free edges, (c) folding the connected layers about their median longitudinal line and connecting them along their free edges.

SHORT DESCRIPTION OF DRAWINGS

The annexed drawing illustrates conduit according to the invention and also schematically show a simple way of producing the said conduits.

Figure 6:
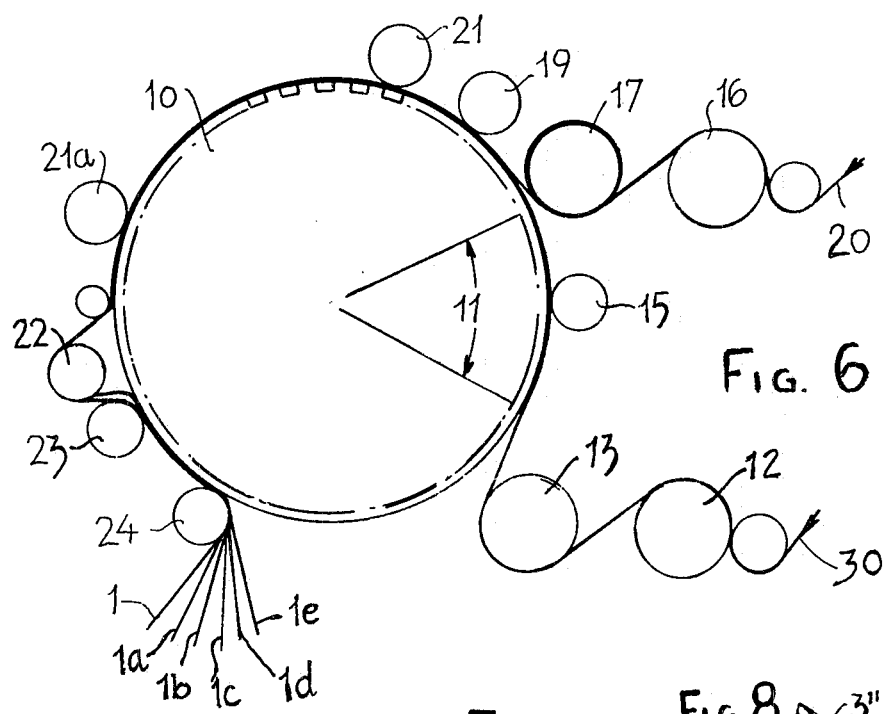
Figure 7:
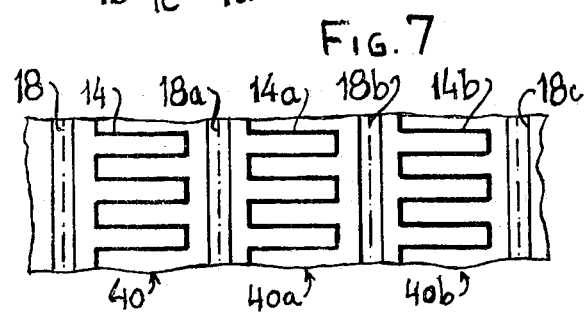
Figure 8:
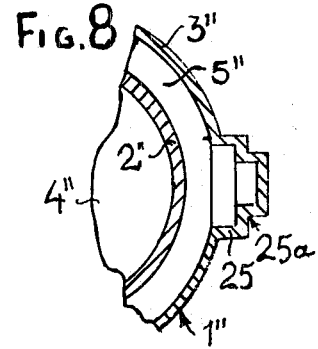

FIG. 6 schematically illustrates an apparatus for making conduits according to the invention, FIG. 7 is a fractional plan view of an embossed sheet intended to be subdivided into individual strips FIG. 8 is a fractional cross section of a conduit for use in irrigation.

DESCRIPTION OF PREFERRED EMBODIMENT

Figure 1:
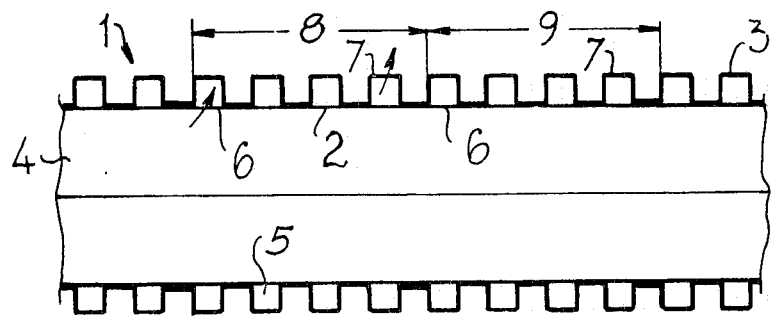
FIG. 1 is an axial view of an assembled conduit according to the invention.

Turning first to FIG. 1, the two foils which form the inner conduit (which will be referred to as the "feed line") and the outer longway passage (to be referred to as the "emitting line") are indicated by the numerals 2 and 3 respectively. In the foil 2 openings 6 are provided at distances from one another. Through these openings water passes from the feed line 4 into the emitting line 5. In foil 3 there are provided—in staggered relationship to openings 6—further openings 7 through which water exits into the open. The emitting line 5 is subdivided into individual stretches, e.g. those indicated by numerals 8 and 9 which are strictly separate from one another and between which no communication exists.

Figure 2:
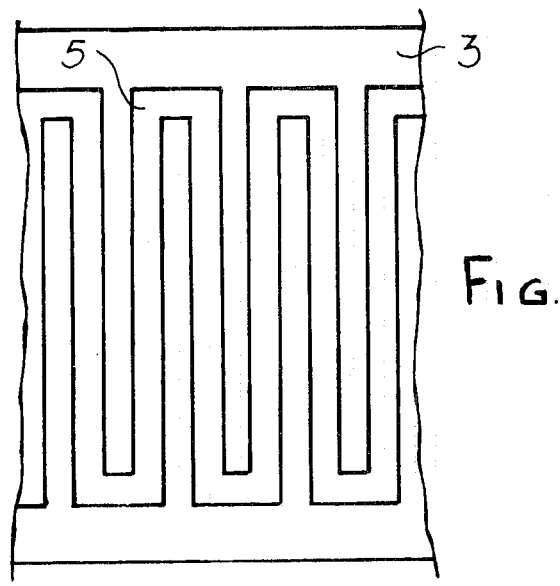
FIG. 2 is a plan view of the outer foil of FIG. 1 (prior to connection to the inner foil).
Figure 3:
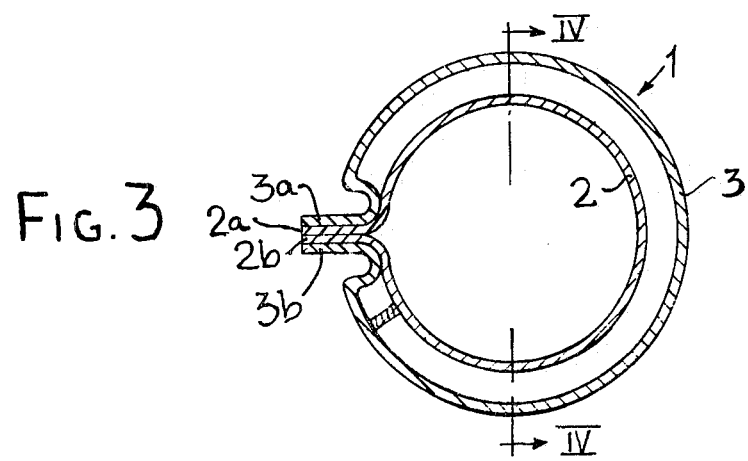
FIG. 3 is a cross sectional view of the connection foils, on line III—III of FIG. 4.
Figure 4:
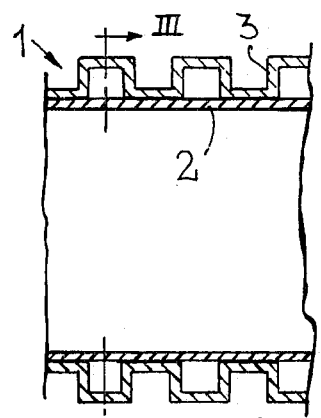
FIGS. 4 and 5 illustrate two executional forms of the invention (FIG. 4 being a section on line IV—IV of FIG. 3).

The build up of the assembled conduit can easily be understood from FIGS. 2-4. FIG. 2 shows one example of profiling of the foil (while still in the plane). Foil 3 constitutes (in the final assembly) one delimiting wall of the emitting line 5. As can be seen, the feed line performs a multiple number of bends and changes of direction. Thus the emitting line is considerably lengthened as compared with the feed line, resulting in a decrease of flow energy and a consequent slow drip—or trickle like emission. Obviously any other regular or irregular pattern could be given to the said emitting line.

FIG. 3 exemplifies the connection of the two foils. The foils 2 and 3 are connected with one another along their edges 2a, 2b, 3a, 3b. Advantageously, and in the case of plastic foils the connection is effected by heat-fusing the edges of the foils. However, it would also be possible to realise the connection by means of an adhesive.

Figure 5:
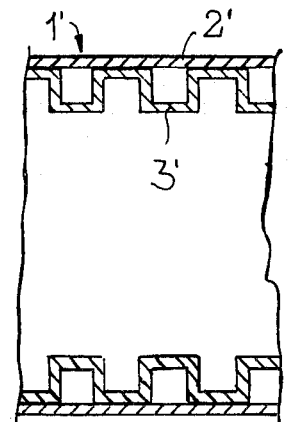

While in the example of FIG. 4 the outer foil 3 has been subjected to treatment resulting in the emitting line 3, the example of FIG. 5 shows a variation in which the emitting line 3' is formed in the wall of the inner foil. Of course—in both cases—the profiling in one foil forms the said emitting line together with the complementary opposite foil—which is plane.

FIG. 6 shows schematically an apparatus for the manufacture of the conduit according to the invention. The apparatus comprises a roller 10, the circumferential face of which is provided with several rows of raised ridges which are destined to cause the profilation of a foil, resulting eventually in the making of the emitting line—as will become clear from the description of FIG. 7. The roller 10 includes a portion 11 which is under vacuum.

A plastic web 30 intended for making the profiled foil 3 is passed over heating rollers 12, 13 onto the roller 10 to be prilated, i.e. embossed in the vacuum range 11 of roller 10. Here several rows of embossed profile come into existance, as indicated by numerals 14, 14a, 14b in FIG. 7. A cutting roller 15 creates apertures 7 in web 30, (see FIG. 1).

A second web 20 intended to form the plane (unembossed) foil 2 is led over heating rollers 16, 17 onto the roller 10 and is fused together with web 30 in the range of zones 18, 18a, 18b, 18c. etc. (see FIG. 7). This may be attained by means of a presser roller 19. A cutting roller 21 creates the openings 6 (see FIG. 1). At the same time the two webs 20 and 30 are fused together on the faces thereof, except along the embossed portions 14, 14a, 14b, etc. which now form the emitting line.

Now the assembly of webs 20 and 30 is cut by means of cutter 21a—along the lines 18, 18a, 18b, etc.—into strips 40, 40a and 40b. These combined strips are now drawn off the roller 10 and are led over a profiled roller 22, are folded lengthwise and are again applied, in this folded state, onto roller 10 where the superposed marginal portions of the strips are fused together. Finally the individual hoses 1, 1a, 1b, 1c, 1d, etc. are pulled off via a roller 24. It goes without saying that the device shown in FIG. 6 constitutes one example only of an apparatus for the manufacture of conduits according to the invention. Obviously changes may be made without departing from the spirit of the invention. So e.g. it would be within the scope of the invention to perform the cutting into strips on separate machines. Equally the apertures for the passage of water may be obtained in other ways.

Furthermore instead of using plane—sheet like—webs of plastic material, extruded hose like materials may be used in their still hot and plastic state. In that case heating roller may be wholly or partly dispensed with.

FIG. 8 is a fractional section through an assembled conduit according to the invention. The conduit 1" which is composed of two foils 2" and 3" in the manner already explained, comprises a feed line 4" and an emitter line 5". The profiled outer foil 3" has outwardly extending bosses 25 at certain distances from one another. The outermost portions 25a of these bosses may be cut away, so as to form outlets from the emitting line. The cutting off of portions 25a may be effected at the site where the conduits are used.

It should be clear that instead of plastics the foils may be of metal, paper or combinations of such materials.

Reinforcements may be provided in the form of wires, strips of stiff material and the like extending lengthwise of the conduits.

What I claim is:

1. A laminated structure for use in irrigation, said laminated structure comprising:
   a first longitudinal layer of flexible flat foil; and
   a second longitudinal layer of flexible flat foil substantially coextensive with said first layer and provided with at least one longitudinally extending area of embossed, raised groove patterns, each of said groove patterns being formed as an elongated circuitous path including a plurality of raised adjacent communicating portions, said elongate path having walls defined by said second longitudinal layer, said walls of said adjacent communicating portions being separated from each other by intermediate areas of said second layer at which said first and second longitudinal layers lie in touching relationship and are fused together;
   said groove patterns being spaced from opposite longitudinal edges of said first and second layers by flat margins free of said embossed groove patterns;
   said first and second layers being fused together in face-to-face confronting relationship at said flat margins, the concavity of said groove patterns being directed toward said first layer, there being at least one hole through said second layer in each said groove pattern and at least one hole through said first layer communicating with a groove in each said groove pattern;
   whereby the substantially flat laminated structure of said first and second layers is easily rolled and transported and is adapted to be converted to an irrigation hose by being folded along its median longitudinal line so said flat margins are in face-to-face contact and are secured together, to define a double wall hose having a single seam and wherein said groove patterns form a portion of the wall of said hose;

whereby fluid can be conducted through the interior of said thus formed irrigation hose, will communicate with said groove patterns from the interior of said hose through one set of said holes and will be emitted external of said hose through the other set of said holes.

2. A laminated structure for use in irrigation, said laminated structure comprising:

a first longitudinal layer of flexible flat foil; and a second longitudinal layer of flexible flat foil substantially coextensive with said first layer and provided with at least one longitudinally extending area of embossed, raised groove patterns, each of said groove patterns being formed as an elongated circuitous path including a plurality of raised adjacent communicating portions, said elongated path having walls defined by said second longitudinal layer, said walls of said adjacent communicating portions being separated from each other by intermediate areas of said second layer at which said first and second longitudinal layers lie in touching relationship and are fused together;

said groove patterns being spaced from opposite longitudinal edges of said first and second layers by flat margins free of said embossed groove patterns;

said first and second layers being fused together in face-to-face confronting relationship at said flat margins, the concavity of said groove patterns being directed toward said first layer, there being at least one hole through said second layer in each said groove pattern and at least one hole through said first layer communicating with a groove in each said groove pattern;

said substantially flat laminated structure of said first and second layers being folded along its median longitudinal line so that said flat margins are in face-to-face contact and are secured together, to define a double wall hose having a single seam and wherein said groove patterns form a portion of the wall of said irrigation hose;

whereby the substantially flat folded laminated structure is easily rolled and transported and is adapted to conduct fluid through the interior of said thus formed irrigation hose, fluid flowing through the interior thereof communicating with said groove patterns from the interior of said hose through one set of said holes and being emitted from said irrigation hose through the other set of said holes.

3. The laminated structure recited in claim 2 wherein said embossed foil constitutes the outermost layer of said irrigation hose.

4. The laminated structure recited in claim 2 wherein said embossed foil constitutes the inner layer of said irrigation hose.

5. The laminated structure recited in claim 2 wherein said foils are plastics.

6. The laminated structure recited in claim 2 wherein said foils are metal.

7. The laminated structure recited in claim 2 wherein said elongated passage is subdivided into sections which are sealed off from one another.

8. A laminated structure for use in irrigation, said laminated structure comprising:

a first longitudinal layer of flexible flat foil; and a second longitudinal layer of flexible flat foil substantially coextensive with said first layer and provided with at least one longitudinally extending area of embossed, raised groove patterns, each of said groove patterns being formed as an elongated circuitous path including a plurality of adjacent raised communicating portions, said elongated path having walls defined by said second longitudinal layer, said walls of said adjacent communicating portions being separated from each other by intermediate areas of said second layer at which said first and second longitudinal layers lie in touching relationship and are fused together;

said groove patterns being spaced from opposite longitudinal edges of said first and second layers by flat margins free of said embossed groove patterns; and a plurality of bosses formed on said second longitudinal layer extending from the surface of said second foil in the direction of and outwardly from said embossed grooved patterns, said bosses being longitudinally spaced by predetermined distances from one another, the interior of each said boss being in communication with the interior of one of said groove patterns;

said first and second layers being fused together in face-to-face confronting relationship at said flat margins, the concavity of said groove patterns being directed toward said first layer, there being at least one hole through said second layer in each said groove pattern and at least one hole through said first layer communicating with a groove in each said groove pattern, the outermost portions of said bosses being adapted to be cut away to form outlets from each said groove pattern;

said substantially flat laminated structure of said first and second layers being folded along its median longitudinal line so that said flat margins are in face-to-face contact and are secured together, to define a double wall hose having a single seam and wherein said groove patterns form a portion of the wall of said irrigation hose;

whereby the substantially flat folded laminated structure is easily rolled and transported and is adapted to conduct fluid through the interior of said thus formed irrigation hose, fluid flowing through the interior thereof communicating with said groove patterns from the interior of said hose through said holes in said first layer and being emitted from said irrigation hose through said bosses.

* * * * *